(12) United States Patent  
Carter et al.

(10) Patent No.: US 11,852,020 B2
(45) Date of Patent: Dec. 26, 2023

(54) ADJUSTABLE INLET GUIDE VANE ANGLE MONITORING DEVICE

(71) Applicant: GENERAL ELECTRIC COMPANY, Schenectady, NY (US)

(72) Inventors: Daniel Carter, Greenville, SC (US); Raymond K. Fong, Greenville, SC (US); Jörg Pfistner, Baden (CH); Mihaela Krizanic-Biscan, Karlovac (HR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/657,637

(22) Filed: Apr. 1, 2022

(65) Prior Publication Data

US 2023/0313699 A1 Oct. 5, 2023

(51) Int. Cl.
| | | |
|---|---|---|
| *F01D 17/16* | (2006.01) | |
| *F01D 17/02* | (2006.01) | |
| *F04D 27/00* | (2006.01) | |
| *F04D 27/02* | (2006.01) | |

(Continued)

(52) U.S. Cl.
CPC ............. *F01D 17/02* (2013.01); *F01D 17/16* (2013.01); *F01D 17/162* (2013.01); *F01D 21/003* (2013.01); *F04D 27/001* (2013.01); *F04D 27/002* (2013.01); *F04D 27/0246* (2013.01); *F05D 2220/32* (2013.01);

(Continued)

(58) Field of Classification Search
CPC .. F04D 27/001; F04D 27/002; F04D 27/0246; F01D 21/003; F01D 17/02; F01D 17/162; F01D 17/20; F01D 17/16; G01B 7/30
See application file for complete search history.

(56) References Cited

U.S. PATENT DOCUMENTS

| | | | |
|---|---|---|---|
| 4,322,887 A * | 4/1982 | Burton | .................... G01B 5/14 |
| | | | 33/552 |
| 4,896,430 A * | 1/1990 | Burton | .................. F01D 21/003 |
| | | | 33/552 |
| 6,948,990 B2 | 9/2005 | Hattori | |

(Continued)

FOREIGN PATENT DOCUMENTS

| | | |
|---|---|---|
| CN | 1748072 A | 3/2006 |
| CN | 208497237 U | 2/2019 |

(Continued)

OTHER PUBLICATIONS

WO2008155402—translation from Espacenet (Year: 2008).*

*Primary Examiner* — Justin D Seabe
*Assistant Examiner* — Behnoush Haghighian
(74) *Attorney, Agent, or Firm* — Eversheds Sutherland (US) LLP

(57) ABSTRACT

The present application provides an adjustable inlet guide vane angle monitoring device for monitoring an angular position of an inlet guide vane mounted about a compressor of a gas turbine engine. The adjustable inlet guide vane angle monitoring device may include a position sensor attached to the inlet guide vane, a sensor plate attached to the position sensor, and a limit switch positioned about the sensor plate. The position sensor determines the angular position of the inlet guide vane and the limit switch prevents movement of the inlet guide vane upon detection of the sensor plate.

19 Claims, 4 Drawing Sheets

(51) Int. Cl.
  *G01B 7/30* (2006.01)
  *F01D 21/00* (2006.01)
(52) U.S. Cl.
  CPC ...... *F05D 2240/12* (2013.01); *F05D 2260/80* (2013.01); *G01B 7/30* (2013.01)

(56) References Cited

U.S. PATENT DOCUMENTS

| | | | |
|---|---|---|---|
| 7,096,657 B2 * | 8/2006 | Mahoney | F02C 9/54 415/150 |
| 7,255,632 B2 | 8/2007 | Tolles et al. | |
| 7,507,921 B2 | 3/2009 | Anderbrugge et al. | |
| 7,700,907 B2 * | 4/2010 | Braun | F02C 7/042 73/1.28 |
| 7,927,067 B2 * | 4/2011 | Rajamani | F04D 29/563 415/118 |
| 8,601,992 B2 | 12/2013 | Fong et al. | |
| 8,857,070 B2 * | 10/2014 | Niederbremer | F04D 29/563 33/534 |
| 9,328,669 B2 | 5/2016 | Rizkalla et al. | |
| 9,612,103 B2 | 4/2017 | Yazdani et al. | |
| 9,702,480 B2 | 7/2017 | Hoots et al. | |
| 9,970,315 B2 * | 5/2018 | DiVincenzo | F01D 9/041 |
| 10,060,285 B2 | 8/2018 | Do et al. | |
| 10,066,761 B1 | 9/2018 | Hernu et al. | |
| 10,704,413 B2 * | 7/2020 | Warren | G01P 5/165 |
| 2005/0147492 A1 * | 7/2005 | Mahoney | F02C 9/54 415/148 |
| 2008/0273965 A1 * | 11/2008 | Rajamani | F01D 21/003 60/39.24 |
| 2009/0021247 A1 * | 1/2009 | Braun | F01D 17/162 324/207.25 |
| 2009/0053036 A1 | 2/2009 | Crawley et al. | |
| 2010/0178152 A1 | 7/2010 | Tillery et al. | |
| 2019/0063245 A1 | 2/2019 | Wojciechowski et al. | |
| 2020/0141331 A1 * | 5/2020 | Tramontin | F04D 29/563 |

FOREIGN PATENT DOCUMENTS

| | | | |
|---|---|---|---|
| GB | 2528891 A | 2/2016 | |
| WO | WO-2008155402 A1 * | 12/2008 | F01D 17/162 |

\* cited by examiner

ADJUSTABLE INLET GUIDE VANE ANGLE MONITORING DEVICE

TECHNICAL FIELD

The present application and the resultant patent relate generally to gas turbine engines and more particularly relate to an adjustable inlet guide vane angle monitoring system which provides remote inlet guide vane position information with increased safety.

BACKGROUND

In a gas turbine engine, the compressor draws in a flow of air. This flow of air may be guided therein by a number of inlet guide vanes. The inlet guide vanes may be arranged circumferentially about an inlet of the compressor. The position of each inlet guide vane may be monitored through a manual dial mounted directly on a vane linkage. Specifically, the dial may have a steel plate with printed angle values. An arrow mounted on the plate moves as the inlet guide vane moves. This manual system, although accurate, cannot be read directly from the control room. As a result, a turbine operator must manually check the position on this dial plate on the compressor. Adjusting the position of the inlet guide vanes and then verifying the actual position thus may be time intensive.

Other issues with current inlet guide vane operation include the fact that the driving linkage arm connected to the linear variable differential transformer generally has a thin rod design. The rod design may be susceptible to bending and may create issues in monitoring actuator movement. Moreover, the linear variable differential transformer only detects linear movement of the inlet guide vane. As a result, angular measurement of the inlet guide vane must be interpolated from the linear movement of the linear variable differential transformer.

SUMMARY

The present application and the resultant patent thus provide an adjustable inlet guide vane angle monitoring device for monitoring an angular position of an inlet guide vane about a compressor of a gas turbine engine. The adjustable inlet guide vane angle monitoring device may include a position sensor attached to the inlet guide vane, a sensor plate attached to the position sensor, and a limit switch positioned about the sensor plate. The position sensor determines the angular position of the inlet guide vane and the limit switch prevents movement of the inlet guide vane upon detection of the sensor plate.

The present application and the resultant patent further provide a method of monitoring an angular position of an inlet guide vane of a compressor of a gas turbine engine. The method may include the steps of attaching a sensor plate to a shaft connected to a sensor, positioning a pair of limit switches about the sensor plate, adjusting a dimension of the sensor plate to indicate maximum angular positions of the inlet guide vane, angularly moving the inlet guide vane, and stopping further angular movement of the inlet guide vane when one of the pair of limit switches detects the sensor plate.

The present application and the resultant patent further provide a compressor of a gas turbine engine. The compressor may include a number of inlet guide vanes and a number of adjustable inlet guide vane angle monitoring devices attached to the inlet guide vanes. Each of the adjustable inlet guide vane angle monitoring devices may include a position sensor attached to a corresponding inlet guide vane, a sensor plate attached to the position sensor, and a pair of limit switches positioned about the sensor plate. The position sensor determines an angular position of the inlet guide vane and one of the pair of limit switches prevents further movement of the inlet guide vane upon detection of the sensor plate.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
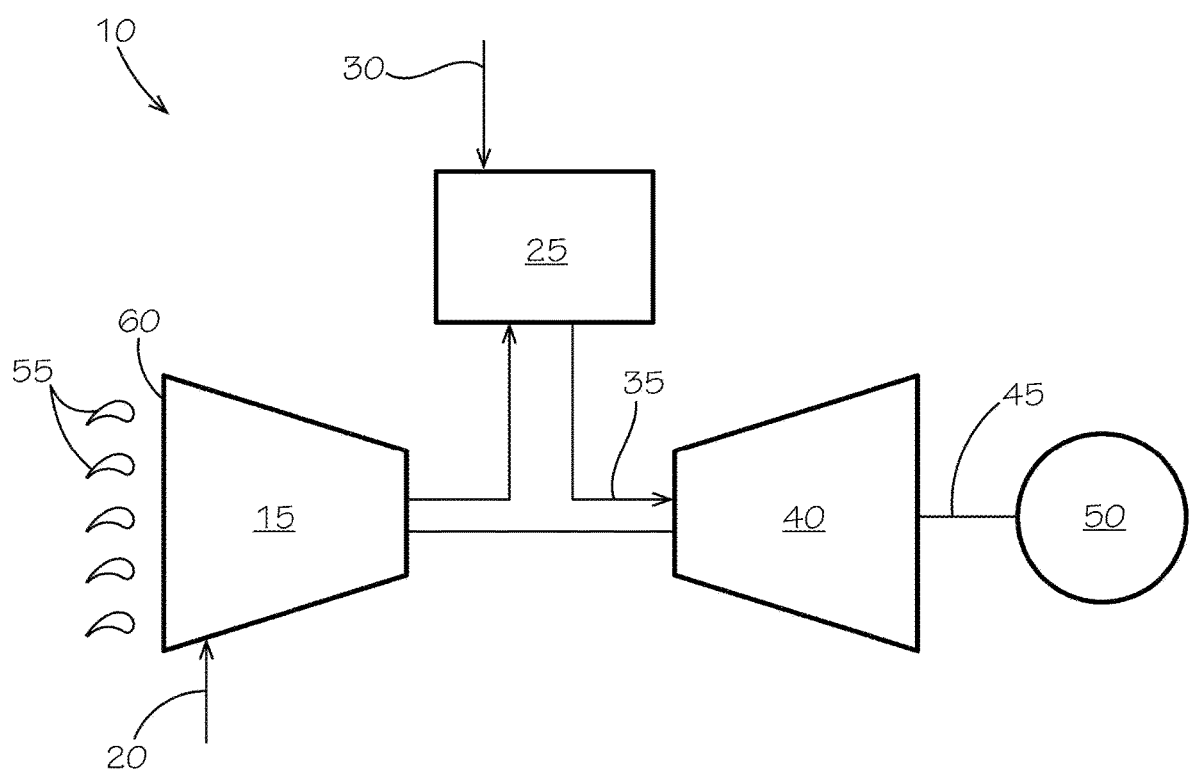
FIG. 1 is a schematic diagram of an exemplary gas turbine engine including a compressor with a number of inlet guide vanes, a combustor, a turbine, a rotor shaft, and an external load.
Figure 2:
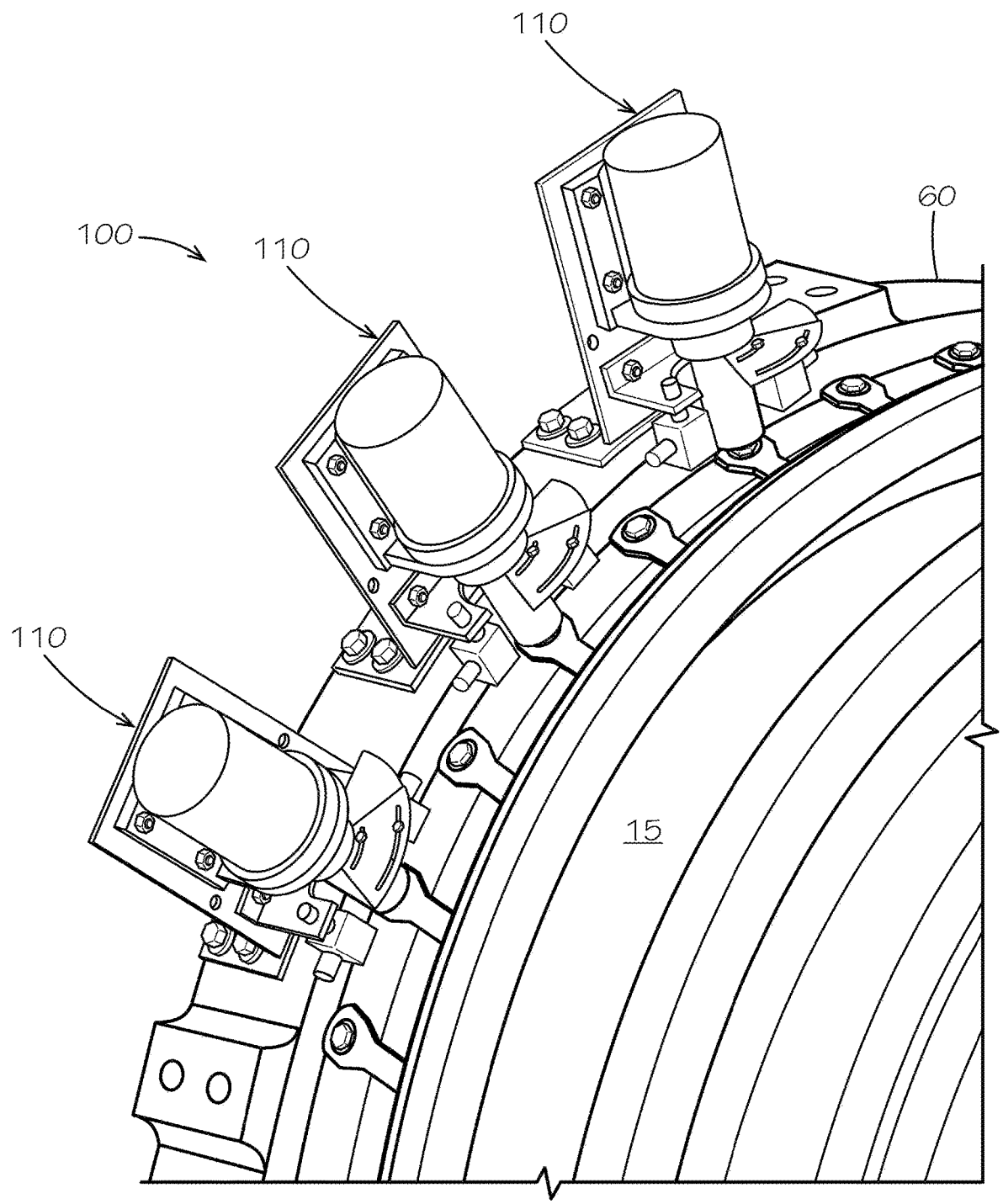
FIG. 2 is a perspective view of a compressor with an adjustable inlet guide vane angle monitoring system as may be described herein.
Figure 3:
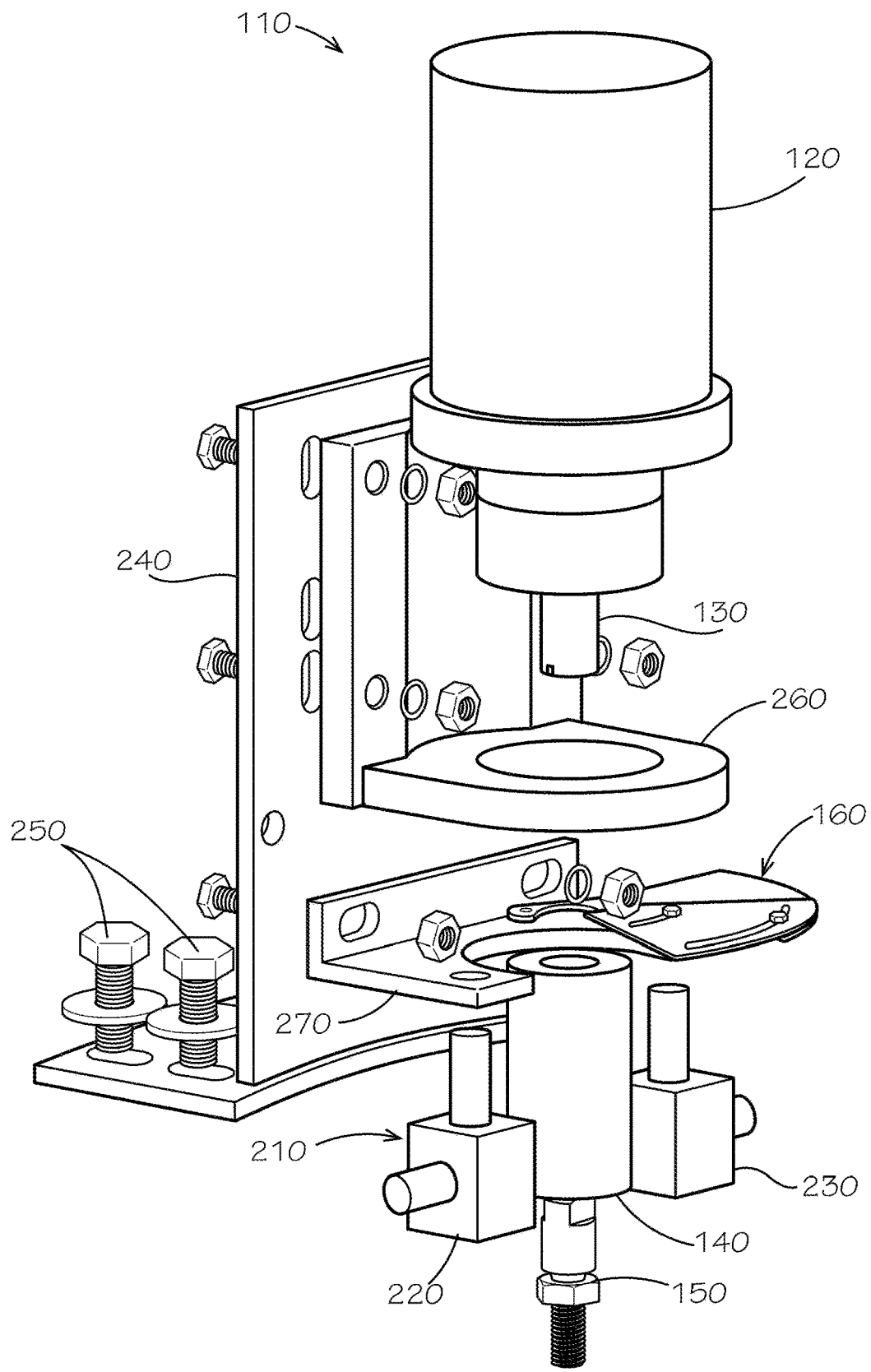
FIG. 3 is an exploded view of an adjustable inlet guide vane angle monitoring device of the adjustable inlet guide vane monitoring system of FIG. 2.
Figure 4:
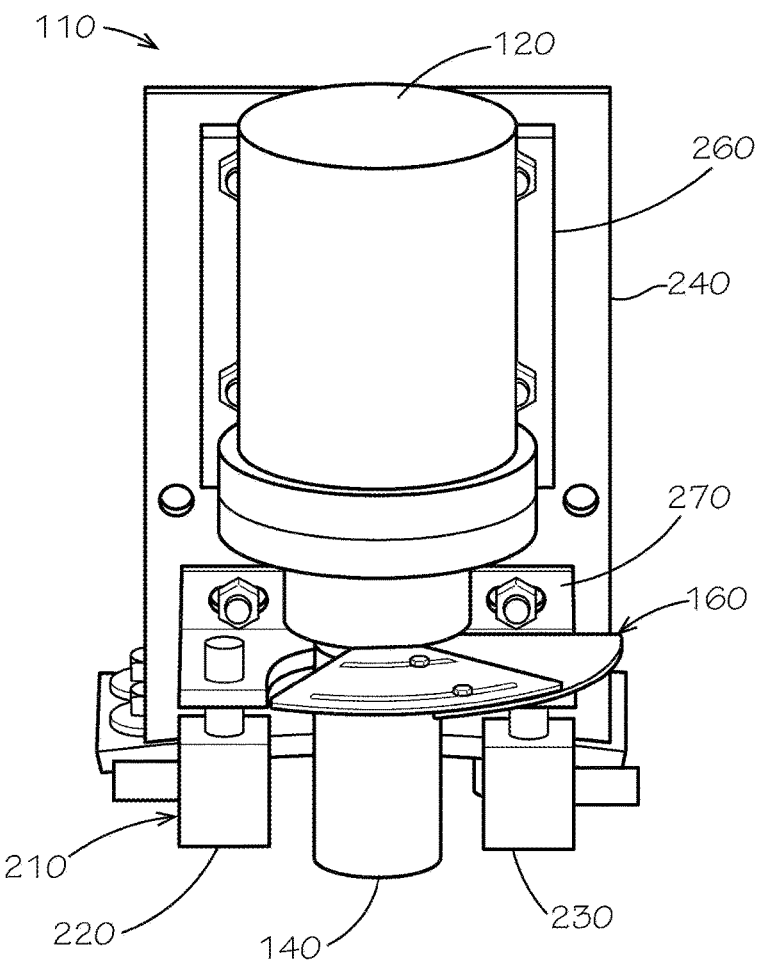
FIG. 4 is a front plan view of the adjustable inlet guide vane angle monitoring device of FIG. 3.
Figure 5:
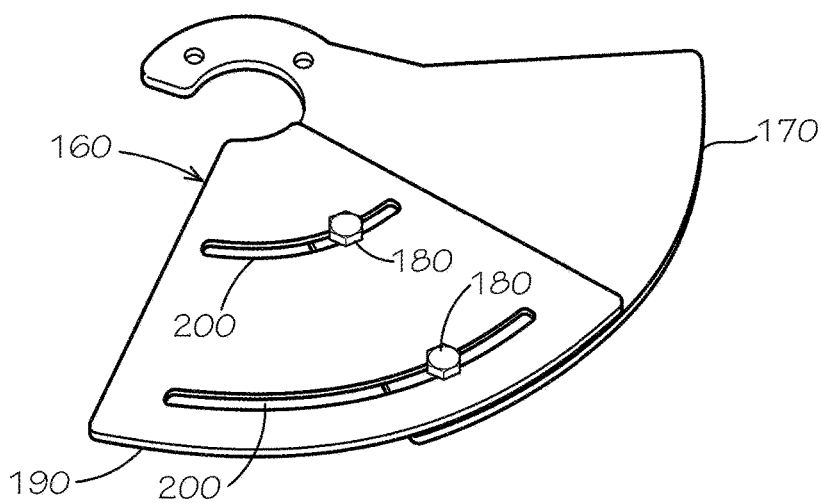
FIG. 5 is a perspective view of an adjustable sensor plate of the adjustable inlet guide vane angle monitoring device of FIG. 3.
Figure 6:
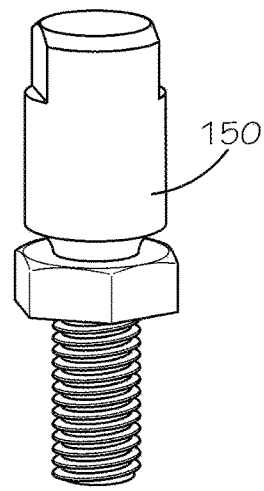
FIG. 6 is a plan view of a coupling adapter of the adjustable inlet guide vane angle monitoring device of FIG. 3.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a combustor 25 (e.g., multiple combustor cans). Each combustor can 25 mixes the compressed flow of air 20 with a pressurized flow of fuel 30 and ignites the mixture to create a flow of hot combustion gases 35. Although only a single combustor can 25 is shown, the gas turbine engine 10 may include any number of combustor cans 25 positioned in a circumferential array around a rotor shaft 45. Alternatively, the combustor 25 may be an annular combustor. The flow of the hot combustion gases 35 is in turn delivered to a turbine 40. The flow of the hot combustion gases 35 drives the turbine 40 to produce mechanical work. The mechanical work produced in the turbine 40 drives, via the rotor shaft 45, the compressor 15, and an external load 50, such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may have different configurations and may use other types of components. The present adjustable inlet guide vane angle monitoring system also may be used with other types of gas turbine engines. Multiple gas turbine engines, other types of turbines, and other types of power generation equipment also may be used herein together.

Load control for the gas turbine engine 10 may be provided in part by a number of inlet guide vanes 55. As described above, the inlet guide vanes 55 may be positioned circumferentially about an inlet 60 of the compressor 15. Specifically, the output of the gas turbine engine 10 may be modulated by changing the position of the inlet guide vanes 55 so as to vary the amount of air entering the compressor 15. Any number of inlet guide vanes 55 may be used herein.

FIGS. 2-6 show an adjustable inlet guide vane angle monitoring system 100 with a number of adjustable inlet guide vane angle monitoring devices 110 positioned about the compressor 15 of the gas turbine engine 10. Specifically, the adjustable inlet guide vane angle monitoring devices 110 may monitor the angular position of each of the inlet guide vanes 55 and transmit feedback thereon. Each of the adjustable inlet guide vane angle monitoring devices 110 may be in communication with a convention controller (not shown) and the like so as to coordinate overall operation of the gas turbine engine 10 and the components thereof.

Each adjustable inlet guide vane angle monitoring device 110 may include a position sensor 120 with a rotating shaft 130. The position sensor 120 may be a rotating variable differential transformer and the like. The rotating variable differential transformer (RVDT) is an electromechanical transducer that provides a variable alternating current (AC) output voltage that is linearly proportional to the angular displacement of the shaft 130. Other types of position sensors may be used herein. The shaft 130 of the position sensor 120 may be attached to the inlet guide vane 55 via a coupling 140 and a coupling adapter 150. Other types of connection means may be used herein.

The adjustable inlet guide vane angle monitoring device 110 may include an adjustable sensor plate 160. The adjustable sensor plate 160 may be attached to the shaft 130 of the position sensor 120 for movement therewith. The adjustable sensor plate 160 may include a first plate 170 with a number of pins 180 and a second plate 190 with a number of tracks 200 (and/or vice-versa) positioned above or below the first plate 170 and in slidable relationship with the first plate 170. The pins 180 of the first plate 170 are maneuverable within the tracks 200 of the second plate 190 such that the overall width or other dimension of the adjustable sensor plate 160 may be adjusted. Other components and other configurations may be used herein.

Positioned underneath or adjacent to the adjustable sensor plate 160 may be a pair of limit switches 210, in this case a first limit switch 220 and a second limit switch 230. Any number of the limit switches 210 may be used herein. The limit switches 210 may be contactless sensors such as Hall effect or inductive proximity sensors and the like. Other types of position sensors may be used herein. The limit switches 210 detect the outer position of the adjustable sensor plate 160. The limit switches 210 may output a signal upon detection of the adjustable sensor plate 160 to prevent further angular movement of the inlet guide vane 55. Other components and other configurations may be used herein.

The adjustable inlet guide vane angle monitoring device 110 may be mounted on to the inlet 60 of the compressor 15 via one or more mounting plates 240. The mounting plate 240 may have any suitable size and shape and may be made from any suitable substantially rigid, heat resistant material. The mounting plate 240 may be attached to the inlet 60 of the compressor 15 (e.g., to the compressor casing) via bolts 250 or any other type of connection means. The mounting plate 240 may include a position sensor bracket 260 for supporting the position sensor 120 and a limit switch bracket 270 for supporting the limit switches 210. The relative positions of the brackets 260, 270 may be adjusted. Other components and other configurations may be used herein.

In use, the position sensor 120 of the adjustable inlet guide vane angle monitoring device 110 accurately determines the angular position of the inlet guide vane 55. The angular position may be outputted to the control room where the turbine operator may adjust the inlet guide vane 55 and verify the actual position without physically being present at the dial plate on the compressor 15 (i.e., the control room is remote from the compressor 15). The adjustable sensor plate 160, in combination with the limit switches 210, limits the most extreme positions of the inlet guide vanes 55 so as to provide a safety margin to prevent possible damage. Likewise, the adjustable sensor plate 160 may be adjusted by "fanning" the plate in or out to allow the user to expand or reduce the extent of angular movement of the inlet guide vane 55 in either direction. This adjustability can accommodate any variation in the installed inlet guide vanes 55 as well as when installing more than one position sensor 120 for average angle position and redundancy. The adjustable inlet guide vane angle monitoring device 110 may be original equipment or part of a retrofit on almost any type of gas turbine engine 10.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. An adjustable inlet guide vane angle monitoring device for monitoring an angular position of an inlet guide vane mounted about a compressor of a gas turbine engine, comprising:

a position sensor attached to the inlet guide vane;

an adjustable sensor plate configured for attachment to the position sensor;

wherein the adjustable sensor plate comprises a first plate and a second plate slidable therewith such that the overall dimension of the adjustable sensor plate may be adjusted; and a limit switch positioned about the adjustable sensor plate;

wherein, when the adjustable inlet guide vane angle monitoring device is installed and operational, the position sensor determines the angular position of the inlet guide vane and the limit switch prevents further angular movement of the inlet guide vane upon detection of the adjustable sensor plate.

2. The adjustable inlet guide vane angle monitoring device of claim 1, wherein the position sensor comprises a rotating variable differential transformer.

3. The adjustable inlet guide vane angle monitoring device of claim 1, wherein the position sensor comprises a rotating shaft.

4. The adjustable inlet guide vane angle monitoring device of claim 3, wherein the rotating shaft is positioned within a coupling and is configured for connection to the inlet guide vane via a coupling adapter.

5. The adjustable inlet guide vane angle monitoring device of claim 3, wherein the adjustable sensor plate is connected to the rotating shaft of the position sensor.

6. The adjustable inlet guide vane angle monitoring device of claim 1, wherein the angular position of the inlet guide vane is outputted to a control room remote from the compressor, where a turbine operator adjusts the angular position of the inlet guide vane.

7. The adjustable inlet guide vane angle monitoring device of claim 1, wherein the first plate comprises a pin and the second plate comprises a track that receives the pin.

8. The adjustable inlet guide vane angle monitoring device of claim 1, wherein the limit switch comprises a contactless sensor.

9. The adjustable inlet guide vane angle monitoring device of claim 1, wherein the limit switch comprises a Hall effect sensor or an inductive proximity sensor.

10. The adjustable inlet guide vane angle monitoring device of claim 1, further comprising a plurality of limit switches.

11. The adjustable inlet guide vane angle monitoring device of claim 1, further comprising a mounting plate configured for attachment to an inlet of the compressor.

12. The adjustable inlet guide vane angle monitoring device of claim 11, wherein the mounting plate comprises a position sensor bracket.

13. The adjustable inlet guide vane angle monitoring device of claim 11, wherein the mounting plate comprises a limit switch bracket.

14. A method of monitoring an angular position of an inlet guide vane of a compressor of a gas turbine engine, comprising:
    attaching a pair of adjustable sensor plates to a shaft connected to a position sensor;
    positioning a pair of limit switches about the pair of adjustable sensor plates;
    adjusting a dimension of the pair of adjustable sensor plates to indicate maximum angular positions of the inlet guide vane;
    angularly moving the inlet guide vane; and
    stopping further angular movement of the inlet guide vane when one of the pair of limit switches detects one of the pair of adjustable sensor plates.

15. A compressor of a gas turbine engine, comprising:
    a plurality of inlet guide vanes; and
    a plurality of adjustable inlet guide vane angle monitoring devices;
    wherein each of the plurality of adjustable inlet guide vane angle monitoring devices comprises a position sensor attached to a corresponding inlet guide vane, a pair of adjustable sensor plates attached to the position sensor, and a pair of limit switches positioned about the pair of adjustable sensor plates such that the position sensor determines an angular position of the inlet guide vane and one of the pair of limit switches prevents movement of the inlet guide vane upon detection of one of the pair of adjustable sensor plates.

16. The compressor of claim 15, wherein the position sensor comprises a rotating variable differential transformer.

17. The compressor of claim 15, wherein the position sensor is attached to the inlet guide vane via a rotating shaft and a coupling adapter.

18. The compressor of claim 15, wherein the pair of adjustable sensor plates comprises a first plate with a pin and a second plate with a track that receives the pin.

19. The compressor of claim 15, further comprising a mounting plate attached to an inlet of the compressor.

* * * * *